UNITED STATES PATENT OFFICE 2,518,456

PREPARATION OF ACYLOXY CARBOXYLIC ACIDS FROM ESTERS OF HYDROXY CARBOXYLIC ACIDS

Martin L. Fein, Riverside, N. J., and Charles H. Fisher, Abington, Pa., assignors to the United States of America as represented by the Secretary of Agriculture No Drawing. Application April 19, 1946, Serial No. 663,337

9 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of acyloxy carboxylic acids by the interaction of hydroxy esters and carboxylic acids, and, in particular, to the production of lower saturated aliphatic acyloxy (including halogen-substituted acyloxy) mono-carboxylic acids, such as alpha-acetoxypropionic acid, acetoxyacetic acid, alpha-acetoxyisobutyric acid, chloroacetoxypropionic acid, and alpha-propionoxypropionic acid, and the simultaneous production of valuable auxiliary esters and acyloxy esters of lower saturated aliphatic carboxylic acids, and has, among its objects, the obtaining of these products in a simple and efficient manner.

The products obtained according to the invention are valuable as such for many purposes and are useful intermediates in the production of solvents, plasticizers, resin intermediates, insecticides, and insect repellents.

In general, according to the invention, a hydroxy ester, in particular, an ester of a lower, saturated, aliphatic alpha-hydroxy mono-carboxylic acid having the formula $$RCR'OHCOOR''$$

where R and R' are H or a lower alkyl, such as $CH_3$ or $CH_3CH_2$, and R'' is an ester group, is mixed with an excess of a lower, saturated, aliphatic mono-carboxylic acid, including lower, halogen substituted aliphatic mono-carboxylic acids having the formula $$R'''COOH$$

where R''' is H or a lower alkyl or halogen substituted alkyl, such as $CH_3$, $CH_3CH_2$, and $CH_2Cl$, with an entraining agent and with an acid catalyst. The reaction mixture is heated, and the water formed in the reaction is removed with a part of the entraining agent by distillation during the reaction. The remaining entraining agent and excess reacting acid are then distilled, following which the formed acyloxy acid and formed acyloxy ester, each corresponding to the ester used and with its acyloxy group derived from the acid used, having respectively the following formulae

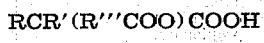

and

are recovered from the residue by distillation at lower temperatures and/or lower pressures.

Other formed auxiliary esters may be distilled at suitable conditions of temperature and pressure or may be recovered from prior distillates.

Example I exhibits the invention in greater detail.

Example I

One mole of methyl lactate, 6 moles of acetic acid, 200 ml. of benzene (as the entraining agent) and 0.5 ml. of concentrated sulfuric acid (as the catalyst) were placed in a one-liter, round-bottom flask, fitted with a thermometer through a 10 mm. internal diameter side arm. The flask was attached to a 24-inch Vigreux column (approximately 20 inches indented) well wrapped with asbestos insulation. The top of the column was fitted with a modified Barrett moisture trap (either plain or water cooled) above which was placed a condenser. The flask was heated with a 550-watt electric heater operating at 70 volts. However, other methods of heating may be used.

Refluxing was carried out at 91–93° C. (temperature of reaction mixture) for approximately five hours until about 18 to 20 ml. of water formed during the reaction and removed with the entraining agent was collected as a layer in the trap. The flask was then transferred to another Vigreux column fitted with a still-head. The thermometer in the flask was replaced by a capillary tube for use during the vacuum distillation. Benzene and excess acetic acid were removed under vacuum supplied by a simple water pump.

Methyl alpha-acetoxypropionate in a yield of 0.35 mole, having a boiling point of 63° to 64° C. at 10.0 mm. Hg and a refractive index of 1.4091 for the yellow sodium line at 20° C., and alpha-acetoxypropionic acid in a yield of 0.51 mole, having a boiling point of 75° to 79° C. at 0.1 mm. Hg and a refractive index of 1.4240 for the yellow sodium line at 20° C., were recovered by distillation at higher vacuum using a motor-driven pump.

The above-described experiment was repeated on a larger scale using toluene as the entraining agent, and the distillate was collected and examined. The distillate was found to contain the entraining agent, water, and methyl acetate, the latter being obtained in high yield.

Variations in the procedure of Example I may be made. Toluene, isopropyl acetate, ethylene chloride, methylene chloride, Skelly solve "B" (essentially n-hexane, boiling range, 63 to 70° C.), cyclohexane, or other entraining agents may be substituted for benzene, some of which will result in a somewhat higher yield of the formed acid and lower yield of the formed ester.

Also, the excess of reacting acid may be varied over a wide range without appreciable effects.

For example, varying the excess of acetic acid in Example I from 2 moles to 10 moles results in little change in yields of the formed acid and formed ester.

Variation in the amount of catalyst used does, however, significantly affect the yields, the larger quantity of catalyst tending to increase the yield of the formed acid and decrease the yield of the formed ester, as illustrated in Table 1, the procedure used in obtaining the data of the various items corresponding to that of Example I, except for variation in the amount of catalyst.

*Table 1*

| Conc. H$_2$SO$_4$ ml. | Yield of formed products, moles | |
|---|---|---|
| | methyl alpha-acetoxypropionate | alpha-acetoxypropionic acid |
| 0.1 | 0.53 | 0.19 |
| 0.2 | 0.51 | 0.28 |
| 0.3 | 0.45 | 0.33 |
| 0.4 | 0.31 | 0.44 |
| 0.5 | 0.35 | 0.51 |
| 0.6 | 0.22 | 0.59 |
| 0.7 | 0.20 | 0.63 |
| 0.8 | 0.28 | 0.57 |
| 1.0 | 0.21 | 0.57 |

Although this invention is primarily concerned with the production of alpha-acetoxypropionic acid and the auxiliary ester, methyl alpha-acetoxypropionate, other acyloxy carboxylic acids and auxiliary esters may be produced by following the procedure of Example 1, except for substituting other reacting esters and other reacting carboxylic acids, and, of course, adjusting the distillation temperatures properly to recover the formed products. Such are exhibited in Table 2 in which the procedure of Example I is followed, except that in Example XI, 0.8 ml. of concentrated H$_2$SO$_4$ was used instead of 0.5 ml. and in Example XIV, 0.5 mole of ethyl lactate and 3 moles of chloroacetic acid were used instead of 1 mole and 6 moles, respectively.

The refractive index $[N]_D^{20}$ and melting points of the products obtained in the various examples are given in Table 3.

*Table 3*

| Product | $[N]_D^{20}$ | M. P., °C. |
|---|---|---|
| acetoxyacetic acid | 1.4230 | 64–66 |
| alpha-acetoxyisobutyric acid | | 76–79 |
| chloroacetoxypropionic acid | 1.4505 | 73–74 |
| acetoxypropionic acid | 1.4240 | |
| propionoxy propionic acid | 1.4250 | |
| ethyl alpha-acetoxypropionate | 1.4092 | |
| isobutyl alpha-acetoxypropionate | [1]1.4121 | |
| n-butyl alpha-acetoxypropionate | 1.4165 | |
| isopropyl alpha-acetoxypropionate | 1.4070 | |
| tetrahydrofurfuryl alpha-acetoxypropionate | 1.4430 | |
| methyl acetoxyacetate | 1.4100 | |
| isobutyl acetoxyacetate | 1.4161 | |
| sec.-butyl acetoxyacetate | 1.4140 | |
| methyl alpha-acetoxyisobutyrate | 1.4139 | |
| ethyl alpha-acetoxyisobutyrate | 1.4125 | |
| ethyl formoxypropionate | 1.4288 | |
| ethyl chloroacetoxypropionate | 1.4355 | |
| methyl propionoxypropionate | 1.4122 | |

[1] At 25° C.

Although the above examples disclose sulfuric acid as the catalyst, other acids, such as sulfonic acid may be used. Also, the reactants may be dissolved in a mutual solvent, if desired.

Having thus described our invention, we claim:

1. A process comprising mixing an ester of a lower, saturated, aliphatic alpha-hydroxy mono-carboxylic acid with an excess of a lower, saturated, aliphatic mono-carboxylic acid, with an entraining agent, and with an acid catalyst, heating the reaction mixture, removing formed water and the entraining agent during the reaction by distillation, and recovering from the residue the formed acyloxy acid which corresponds to the reacting ester with its acyloxy group derived from the reacting acid.

2. The process of claim 1, in which the reacting ester is a lactate, and the reacting acid is acetic acid.

3. The process of claim 1, in which the reacting ester is a lactate, and the reacting acid is a halogen-substituted acetic acid.

*Table 2*

| Example | Reactants | | Products obtained, yields and characteristics | | | | | | |
|---|---|---|---|---|---|---|---|---|---|
| | Ester | Acid | Acid | | | | Ester | | |
| | | | | Yield, Mole | B. P., °C. | P. mm. Hg | | Yield, Mole | B. P., °C. | P. mm. Hg |
| II | ethyl lactate | acetic | alpha-acetoxypropionic | 0.50 | 75–79 | 0.1 | ethyl alpha-acetoxypropionate | 0.38 | 91 | 28.0 |
| III | isobutyl lactate | do | do | 0.35 | | | isobutyl alpha-acetoxypropionate | 0.45 | 74 | 5.3 |
| IV | n-butyl lactate | do | do | 0.28 | | | n-butyl alpha-acetoxypropionate | 0.55 | 105 | 15.0 |
| V | isopropyl lactate | do | do | 0.17 | | | isopropyl alpha-acetoxypropionate | 0.66 | 77 | 13.4 |
| VI | tetrahydrofurfuryl lactate | do | do | | | | tetrahydrofurfuryl alpha-acetoxypropionate | 0.46 | 115 | 3.2 |
| VII | methyl hydroxy acetate | do | acetoxyacetic | 0.50 | 78 | 0.4 | methyl acetoxyacetate | 0.31 | 173–174 | 760.0 |
| VIII | isobutyl hydroxy acetate | do | do | 0.43 | | | isobutyl acetoxyacetate | 0.49 | 61–62 | 2.0 |
| IX | sec.-butyl hydroxy acetate | do | do | 0.10 | | | sec.-butyl acetoxyacetate | 0.68 | 53 | 0.7 |
| X | methyl alpha-hydroxyisobutyrate | do | alpha-acetoxy isobutyric | 0.29 | 79 | 0.2 | methyl alpha-acetoxyisobutyrate | 0.45 | 67–69 | 16.8 |
| XI | ethyl alpha-acetoxyisobutyrate | do | do | 0.19 | | | ethyl alpha-acetoxyisobutyrate | 0.47 | 74 | 14.6 |
| XII | do | do | do | | | | do | 0.51 | | |
| XIII | ethyl lactate | formic | | | | | ethyl formoxypropionate | 0.33 | 91 | 1.2 |
| XIV | do | chloroacetic | chloroacetoxy propionic | 0.19 | 113–118 | 0.4 | ethyl chloroacetoxy propionate | 0.23 | 69–71 | 0.6 |
| XV | methyl lactate | propionic | propionoxy propionic | 0.47 | 86–89 | 0.8 | methyl propionoxy propionate | 0.35 | 70 | 9.9 |
| XVI | beta-butoxy-ethyl lactate | acetic acid | | | | | beta-butoxyethyl alpha-acetoxy propionate | 0.55 | 120–121 | 5 |

4. The process of claim 1, in which the reacting ester is a lactate, and the reacting acid is propionic acid.

5. A process comprising mixing an ester of a lower, saturated, aliphatic alpha-hydroxy monocarboxylic acid with an excess of a lower, saturated, aliphatic mono-carboxylic acid, with an entraining agent, and with an acid catalyst, heating the reaction mixture, removing formed water and the entraining agent during the reaction by distillation, and recovering from the residue the formed acyloxy acid and formed acyloxy ester, each corresponding to the reacting ester and with its acyloxy group derived from the reacting acid.

6. A process comprising mixing methyl lactate with an excess of acetic acid, with an entraining agent, and with an acid catalyst, heating the reaction mixture, removing formed water, the retraining agent and formed methyl acetate during the reaction by distillation, recovering the methyl acetate from the distillate, and recovering from the residue the formed methyl alpha-acetoxypropionate and formed alpha-acetoxypropionic acid.

7. The process of claim 6 characterized in that the heating is continued for about 5 hours.

8. A process of simultaneously producing methyl alpha-acetoxypropionate and alpha-acetoxypropionic acid comprising mixing methyl lactate with an excess of acetic acid, with an entraining agent, and with from 0.1 to 1.0 ml. of concentrated $H_2SO_4$ per mole of methyl lactate, the larger quantity of the $H_2SO_4$ being used to produce the larger yield of the alpha-acetoxypropionic acid, heating the reaction mixture, removing formed water, the entraining agent and formed methyl acetate during the reaction by distillation, and recovering from the residue the formed methyl alpha-acetoxypropionate and formed alpha-acetoxypropionic acid.

9. Process for the manufacture of alpha-acyloxy lower aliphatic monocarboxylic acids comprising heating a lower alkyl ester of an alpha-hydroxy lower aliphatic monocarboxylic acid with an excess of a lower aliphatic monocarboxylic acid with a liquid water-entraining agent in the presence of an acid catalyst, removing formed water and the water-entraining agent during the reaction by distillation and recovering the alpha acyloxy lower aliphatic monocarboxylic acid.

MARTIN L. FEIN.
CHARLES H. FISHER.

REFERENCES CITED

The following references are of record in the file of this patent:

UNITED STATES PATENTS

| Number | Name | Date |
|---|---|---|
| 2,107,202 | Lock | Feb. 1, 1938 |
| 2,158,107 | Carruthers | May 16, 1939 |
| 2,265,946 | Loder | Dec. 9, 1941 |
| 2,355,971 | Hansley | Aug. 15, 1944 |

OTHER REFERENCES

Fein et al.: "Ind. and Eng. Chem.," vol. 36 (1944), pages 235–238.

Filachione et al.: "Ind. and Eng. Chem.," vol. 36 (1944), pages 472–475.